Dec. 13, 1932.  J. S. WIGNALL  1,890,961
DIRECTION SIGNAL FOR VEHICLES
Filed May 24, 1926  2 Sheets-Sheet 1

Inventor
Joseph S. Wignall

By J. M. Thomas
Attorney

Dec. 13, 1932. J. S. WIGNALL 1,890,961
DIRECTION SIGNAL FOR VEHICLES
Filed May 24, 1926 2 Sheets-Sheet 2

Inventor
Joseph S. Wignall

By J. M. Thomas
Attorney

Patented Dec. 13, 1932

1,890,961

UNITED STATES PATENT OFFICE

JOSEPH S. WIGNALL, OF PAYSON, UTAH

DIRECTION SIGNAL FOR VEHICLES

Application filed May 24, 1926. Serial No. 111,200.

My invention relates to direction signals for road vehicles and has for its object to provide a new signalling means for indicating the intentions of the operator of the vehicle, such as a truck or automobile, to stop, turn to left or to the right as soon as desired, and to display a signal when the vehicle is stopped.

These objects I accomplish with the device illustrated in the accompanying drawings in which similar letters and numerals of reference indicate like parts throughout the several views and as described in the specification forming a part of this application and pointed out in the appended claims.

Figure 1:
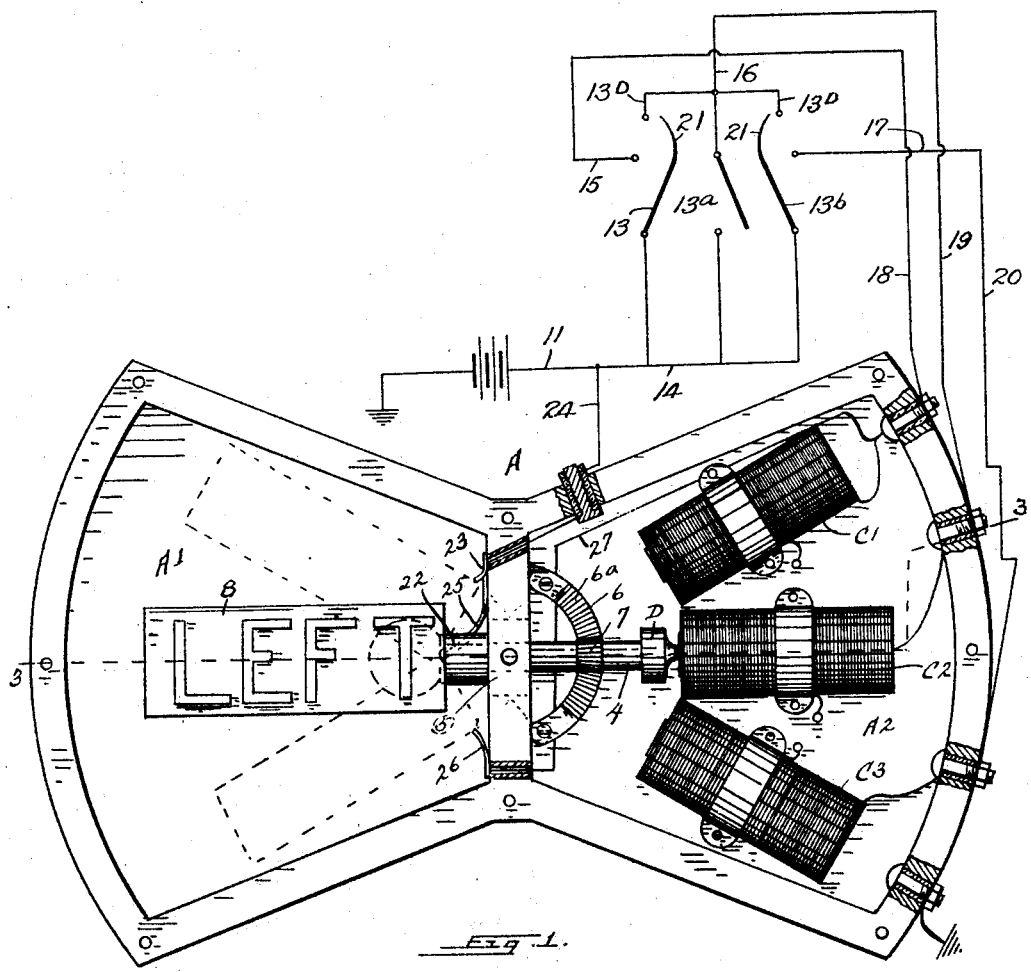
Figure 2:
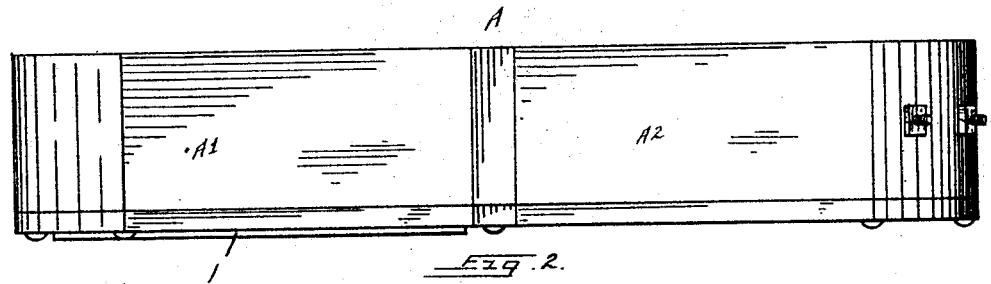
Figure 3:
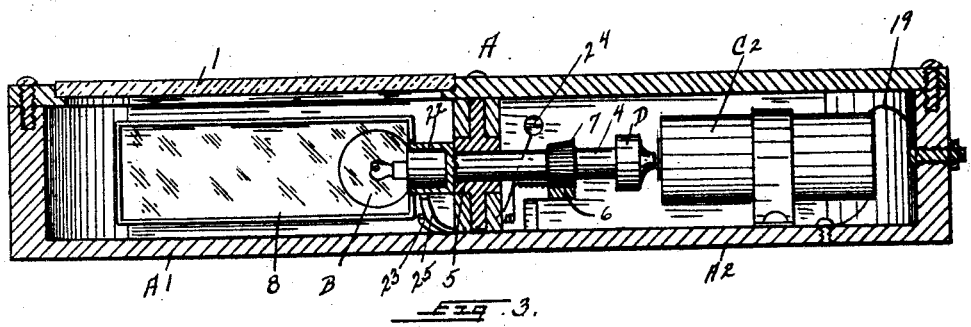
Figure 4:
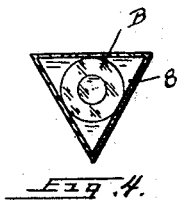
Figure 5:
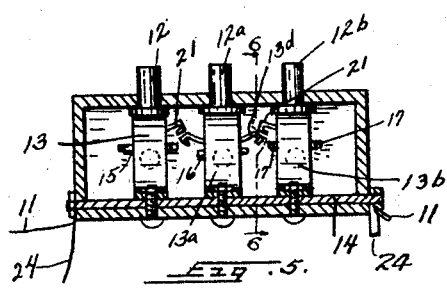
Figure 6:
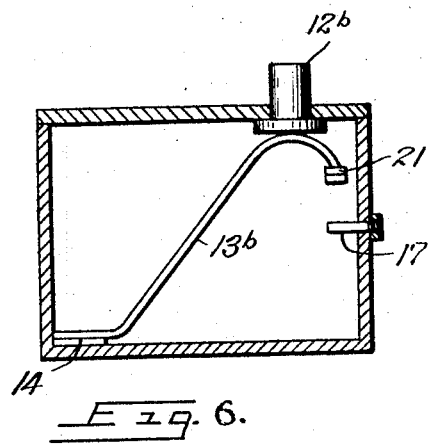

In the drawings in which I have shown the best and most substantial embodiment of my invention, Figure 1 is an elevation of the apparatus with the cover plate removed, and with the electrical switch and wiring shown diagrammatically. Figure 2 is an edge view of the casing of my apparatus. Figure 3 is a longitudinal section on line 3—3 of Figure 1, with parts shown in elevation. Figure 4 is a transverse section of the signal case with the end of the light socket in elevation. Figure 5 is a side elevation of the switch. Figure 6 is a section on line 6—6 of Figure 5.

In the drawings I have shown the casing A which is given the form of two diametrically opposed segment wings A1 and A2, one of which contains the signal housing, and the other the electro-magnets. The wing A1 has a transparent side or face 1 through which the signs "Stop", "Left" and "Right" may be seen when illuminated by the electric light globe B. Within the segment wing A2 are mounted three electro-magnets C1, C2 and C3, and connected with the battery of the vehicle. Within the segment wing A2 is pivotally mounted a soft steel weight D which may be partially rotated around the axis of the said wings A1 and A2, and at the same time partially rotated on its own axis. The said weight is screwed on one end of a shaft 4 which is journalled in a trunnion bearing 5, adjacent a segment rack 6 having teeth 6a on a portion of one side face. A pinion gear 7 is secured on the shaft 4 of said weight D, the teeth of which pinion gear mesh with the teeth of said rack 6 in order that as the weight is moved over the rack for any part of its travel the pinion gear 7 is rotated and with it the said shaft 4. On the other end of said shaft 4 a light globe socket is secured to receive the globe B. A signal housing 8 is also secured on and rotatable with said light globe socket, and is triangular in cross section. The said housing 8 and the light socket 22 are heavier in weight than the weight D, so that the signal when not being used rests always at the downward position or the "Stop" indication position. The said housing 8 has colored lenses thereon, two of which are red in color and the other is green, and so positioned relative to the electro-magnets that when the magnet C1 is energized the sign "Stop", will incline downwardly, and when in that position the sign housing 8 will display a red sign, and when the magnet C2 is energized the sign "Left" will be shown horizontally, and red light rays will be shown, and when the magnet C3 is energized rays of green light will be shown with the sign "Right" displayed and the housing inclined upwardly. A manually operated switch 10 is mounted on the instrument board of the vehicle and is connected with the battery by the wire 11. The said switch is of the commonly known spring type and has three push buttons 12, 12a and 12b on its face. Each button is connected with its respective spring 13, 13a and 13b, and all of them are connected with a bar 14 to which the battery wire is secured. Connections 15, 16 and 17 are secured on the back of said switch and each is in direct alinement with one of the push buttons and springs 13 so that when the button 12 is pressed and the spring 13 flexed the switch connection is made and the electric current passes through the switch to the respective electro-magnet. Wires 18, 19 and 20 connect the electro-magnets C1, C2 and C3 with their respective switch connections 15, 16 and 17. Each of the said switch springs 13 and 13b has a cross spring 21 attached to its extreme end, and the adjacent ends of each of the outside portion or extension of the springs 21, will be brought into electrical contact with the center spring 13D, which is formed on the inside of the connection 16, when either of the said springs is pressed to make electrical contact with its connection. The switch buttons 12 are pressed down beyond the side spring 13b and brought into contact with the connections 15 and 17 in the case of the two outside buttons, thus the electro-magnets are each operated independently when the buttons are fully compressed to give the direction signal desired. The spring 13b springs upward out of contact with the springs 13 and 13d after the magnet C2 has been energized to move the weight into alignment therewith. This construction of the springs will make the center electro-magnet operate each time that the signal is drawn from "Right" to "Stop" or from "Stop" to "Right", thus taking some of the load from the end magnets when the shift is from one extreme to the other. The circuit through the lamps is as follows: The current from the battery is directed to the lamps through the wire 24 and the contacts 23, 25 and 26 and the completion of the circuit is through the shaft 4 to the grounded casing A. The lights do not light until one of the contacts 23, 25 or 26 are engaged with the base and the base 22 is insulated from the bar or shaft 4, grounding the end of the circuit, thereby completing the circuit from the battery to the ground.

The electromagnet C1 is used to actuate the device more quickly when turning the device to that position indicating "Stop," after it has been in some other position.

The operation of my apparatus is as follows:—

My apparatus may be mounted on any desired rear portion of the vehicle and with electric energy supplied from the battery on the vehicle to the switch 10, that is for convenience secured on the instrument board. When the driver desires to turn, for example, to the right, the push button 12b is pressed inwardly and the spring 13b will be flexed to form an electrical contact with the connection 17. The electrical energy will pass through the bar 14, the spring 13b, the connection 17, and the wire 20 to the electro-magnet C3, which electro-magnet has one end grounded to the frame to complete the electrical circuit to the battery and the pull of the magnet will pull the weight D in alinement with its core. As the weight D is pulled downwardly the shaft 4 and pinion 7 will be rotated as the pinion passes on the rack 6, and rotates the lens housing 8, and bring the signal "Right" into view through the transparent portion 1, and the general direction of said housing will be inclined upwardly, as shown in dotted line in Figure 1. To indicate a stop of the vehicle, the driver will press the push button 12 inwardly. As the push button 12 is pushed inwardly, the spring 21 will come in contact with the spring 13d, and electrical energy will pass through the connection 16, wire 19 and the electro-magnet C2 which is also grounded to complete the electrical circuit to the battery. This will draw the weight D into alinement with the electromagnet C2 and will rotate the shaft 4, housing 8, until the signal "Left" is in sight, and as the push button 12 is pushed farther inwardly the contact between the spring 21 and the spring 13d is broken, and the spring 13 will be brought into contact with the connection 15, and electrical energy will pass through the wire 18, and the electro-magnet C1. The weight D will be brought into alinement with the magnet C1, and the shaft 4 and its assembly will be rotated axially and on its pivot, and the signal "Stop" will be in sight through the transparent sight opening 1. When the housing 8 is in position for a "Right" turn, electrical contact will be made through the base 22 of said housing and the contact spring 23, and electric current will be carried through the wire 24 and the lamp globe B will be illuminated. When the "Left" turn is desired, the base 22 will be brought into contact with the spring 25, which is in electrical connection with the wire 24, and the light globe B will again be illuminated. When the "Stop" signal is desired and the housing 8 has been brought to the "Stop" position, electrical connection will be made through the base 22 and the spring 26. The spring 26 is connected with a wire 27, which in turn is connected with the wire 18, and as the electrical current is passing through the wire 18 to energize the electro-magnet C1, the current is also passed through the wire 27, spring 26 to the base 22, and the light globe B will be illuminated.

The invention consists of the construction, arrangement and combination of the various parts as shown, and it is to be understood that slight changes may be made in the shape, size and arrangements of parts without departing from the spirit of the invention and within the scope of the claims.

Having described my invention and its operation, I desire to secure by Letters Patent and claim:—

In a device of the class described the combination of a casing formed of wing shaped segments one of which has a transparent covering thereover; a three sided signal housing carried under the transparent end of said casing; a shaft secured to one end of said housing and carried in said casing; a bearing for said shaft to allow said shaft to rotate therein said bearing being pivoted in said casing; a plurality of electromagnets mounted in the opposite end of said casing to said sign housing; a weight secured on the end of said shaft said weight to be actuated by the magnetic attraction of said magnets; a segment rack secured to said casing adjacent said electromagnets; a pinion gear secured on said shaft meshing with said rack; and an electric light globe carried in said signal housing.

In testimony whereof I have affixed my signature.

JOSEPH S. WIGNALL.